United States Patent [19]

Soyez

[11] Patent Number: 4,465,596

[45] Date of Patent: Aug. 14, 1984

[54] PROCESS FOR REMOVING HEAVY METAL ASH FROM AN AQUEOUS SOOT SUSPENSION

[75] Inventor: Werner Soyez, Itzehoe, Fed. Rep. of Germany

[73] Assignee: Chemische Werke Huls Aktiengesellschaft, Marl, Fed. Rep. of Germany

[21] Appl. No.: 550,390

[22] Filed: Nov. 10, 1983

[30] Foreign Application Priority Data

Nov. 10, 1982 [DE] Fed. Rep. of Germany ....... 3241538

[51] Int. Cl.³ .............................................. B01D 11/02
[52] U.S. Cl. .................................... 210/634; 210/729; 210/804
[58] Field of Search ............... 210/704, 708, 710, 729, 210/730, 800, 804, 634

[56] References Cited

U.S. PATENT DOCUMENTS

| | | | |
|---|---|---|---|
| 2,789,083 | 4/1957 | Hardy | 210/708 X |
| 3,148,140 | 9/1964 | Kaiser et al. | 210/634 |
| 3,694,355 | 9/1972 | Visser et al. | 210/634 |
| 4,014,786 | 3/1977 | Potter et al. | 210/634 X |
| 4,123,235 | 10/1978 | Giesen et al. | 210/634 X |
| 4,315,834 | 2/1982 | Van Deraerschot | 210/634 X |

FOREIGN PATENT DOCUMENTS 1076092 8/1957 Fed. Rep. of Germany .
1042793 8/1957 Fed. Rep. of Germany .

OTHER PUBLICATIONS

Gas-und Wasserfach, 19 (1964), 512ff.

Primary Examiner—Thomas G. Wyse
Attorney, Agent, or Firm—Oblon, Fisher, Spivak, McClelland & Maier

[57] ABSTRACT

The invention relates to a process for removing heavy metal ash from an aqueous soot suspension like that found in the production of synthetic gas through partial gasification of heavy oils. This soot suspension is treated initially in the standard manner with adjuvants suitable for the separation of soot and which are not miscible in water followed by separation of the aqueous phase. The process is characterized by the fact that ash components in the aqueous phase, are brought to a sedimentation stage for settling and are subsequently removed from the water circulation system.

5 Claims, No Drawings

PROCESS FOR REMOVING HEAVY METAL ASH FROM AN AQUEOUS SOOT SUSPENSION

BACKGROUND OF THE INVENTION

1. Field of the Invention

This invention relates to an improved process for removing heavy metal ash components from an aqueous soot suspension. More specifically, the heavy metal ash component is removed from the aqueous phase, which has been separated from the suspended soot during the standard treatment of an aqueous soot suspension, by directing the aqueous phase to a sedimentation stage for settling and subsequent removal from the aqueous phase.

2. Description of the Prior Art

Synthetic gas may be produced through the partial oxidation of oils having varying consistency and composition using oxygen or air and steam. One of the processes used over the past 25 years is the Shell heavy oil gasification process. (See *Gas - und Wasserfach*, 19 (1964), 512ff.)

In this noncatalytic partial combustion process the reactor temperatures range from ca. 1,200° to 1,600° C., and pressures preferably range from 40 to 60 bar. The recovery of the heat of the sooty synthetic gas takes place in the waste-heat boiler, to which are attached the washing plant for the removal of soot and the soot separating plant.

The amount of soot produced during gasification, ca. 1-2% of the feed oil, is precipitated with the circulating water and removed in the form of a soot slurry, e.g., in accord with DE-PS No. 1 076 092. In the preferred embodiment an organic adjuvant that is not miscible in water and that is capable of holding the soot, e.g., mineral oil, is added to the aqueous soot suspension. (See for example DE-PS No. 1 042 793.) The soot water is purified through mixing with hydrocarbons, whereby lighter hydrocarbons form a floating soot-hydrocarbon mixture, also known as soot gasoline, while the heavier hydrocarbons form soot-hydrocarbon agglomerates. The soot-oil pellets formed during mixing under stirring are removed using vibrating screens. The purified water is then returned to the circulating water system of the heavy oil gasification plant in the form of scrubber feed water. Formerly the pellets were used mainly for undergrate firing. Today the soot pellets are mixed if possible with other oil, homogenized, and added once again to the feed oil. If the soot were to consist of pure carbon, a 100% recycling of the soor would in theory be possible.

Unfortunately, however, the soot contains ash components comprising a significant amount of heavy metal compounds especially sulfides and oxides of mainly vanadium, nickel and iron which are present in the feed oil. During the recycling of the soot back to the feed oil, these ash components build up in the feed oil, the soot water, the circulating water, the waste water and the soot pellets. Higher concentrations of ash in heavy oil gasification lead to such deleterious effects as damaged reactor linings and obstructions in the waste-heat boilers. In addition to the ash level in the circulation systems of the Shell plant, there is also an increase in the metal-carbonyl transfer to the connected gas purifiers which leads to operating disturbances and resulting in sulfide precipitation. The impact of these problems lead to more serious consequences such as plant shutdowns and expensive cleaning operations. As a result, a higher rate of soot recycling is impossible. A portion of the accumulating gasification soot, or pellets, must be removed from the plant, underfired externally, or sold. Even comparatively low recycling rates (<50%) are already leading to an increase in the level of metal in all parts of the circulating system and, in turn, burdening the gasification reactors as well as the connected parts of the plant and the waste water facility.

With the transition to increasingly heavier feed oils, there has been an increase in the introduction to the ash gasification reactors constituents rich in heavy metals. Since the heavy metal compounds following the soot water separation were detected in nearly quantitative levels in the soot hydrocarbon phase, it was assumed that the ash components were incrusted in the soot. This assumption was based on the fact that it was not possible to separate the ash component in the soot using the practical methods acquired in the soot water separation, such as the use of filters, e.g., cloth filters, filter candles and coarse sand filters.

The production of pellets with reduced levels of heavy metal compounds has been accomplished by the treatment of the soot suspension with air, oxygen or mechanical action. Following the removal of the soot from the soot water, the bulk of the ash components remain behind in concentrated form in the discharge water. However, proposed methods for the separation of such ash components contain only vague data or general references to standard filtration techniques, particularly with respect to the problem of separating the most finely dispersed ash particles. The separation of the ash components from the discharge water is, nonetheless, imperative, because this water otherwise would be returned to the circulation system with ever increasing amounts of metal and in the end this would again lead to an incorporation of ash in the pellets. The separation of the ash component from the discharge water is also necessary for ecological reasons and to protect the connected parts of the plant. The use of conventional filters and centrifugal separators to achieve this end is not cost effective because of the low concentration of the ash components accompanied with the large quantity of filtrate. Coarse sand filters offer only a partial solution to the problem, since the filtered substance must be driven from the filter through back flushing, whereupon it is again present in a very finely dispersed state and in very low concentration in a large volume of water.

The above discussed problem of the buildup of heavy metal ash in the soot and water circulating systems has been generally known since the introduction of the Shell process some 25 years ago. Despite worldwide efforts no one has successfully solved the problem. High recycling rates (>80%) have so far been maintained only for short periods.

SUMMARY OF THE INVENTION

In accordance with the present invention it has been discovered that the heavy metal ash components occurring in an aqueous soot suspension can be effectively removed by directing the separated aqueous phase from the standard process to a sedimentation stage for settling and subsequent removal from aqueous phase.

Further in accordance with the present invention, the separated aqueous soot-free phase may optionally be concentrated preliminary to the sedimentation stage by use of filters.

Still further in accordance with the present invention, it has been discovered that high recycling rates (>80%) have been maintained for continuous periods in the water circulation system of a synthetic gas production plant.

Still further in accordance with the present invention, it has been discovered that a highly effective removal of the heavy metal ash components from the separated aqueous phase may be achieved by using the simplest technical equipment at a relatively small expense. This fact along with the foregoing results in a highly cost-effective separation of the heavy metal ash components from an aqueous soot suspension.

DESCRIPTION OF THE PREFERRED EMBODIMENTS

In searching for a process enabling the cost-effective separation of the ash components from the soot-free, circulating water and the discharge of these separated ash components from the water/waste water system of a heavy oil gasification plant, it was discovered, contrary to earlier notions, that with standard soot gasoline decantation as well as with soot pelletization, significant amounts of ash are not bound to the soot but remain in the discharge water which is due probably to the varying affinity to the available hydrocarbons. Unexpectedly it was demonstrated in this regard that, following the separation of the soot, the ash components remaining in the water exhibit a strong tendency to settle out. This unexpected discovery resulted in an effective and economical concentration and removal of the ash components from the soot-free circulating water or discharge water. It was also discovered that it is possible to achieve this desired removal of ash components by using the simplest technical equipment.

The invention thus relates to a process for removing heavy metal ash from an aqueous soot suspension like that found in the production of synthetic gas through partial gasification of heavy oils. The soot suspension is treated in the standard manner with organic adjuvants suitable for the separation of soot and which are not miscible in water and, if necessary, with the subsequent pelletization of the separated soot. The aqueous soot-free phase is separated, the ash components in this aqueous phase after preliminary concentration, if necessary, by filters are directed to a sedimentation stage for settling and are subsequently removed from the water circulation system.

The preferred sedimentation stage is one with an hourly throughput capacity of 0.2 to 2 m$^3$/m$^2$ of settling surface.

With the modification in accordance with the present invention to the standard process, the level of ash in the soot and water circulating systems is sharply reduced. This modification enables a dramatic increase in recycling rates of up to practically 100%. In other words, with only a small amount of technical expense, a highly cost-effective separation can be achieved.

The following non-limiting Examples are afforded in order that those skilled in the art may more readily understand the present invention and specific preferred embodiments thereof in accordance with the foregoing description of the improved process of the present invention.

COMPARISON EXAMPLE A; STANDARD PROCESS

In the fixed operation of the plant the circulating water (80–100 m$^3$/h) is pumped from the (1) water condenser to the (2) scrubber to the (3) quenching pipe to the (4) soot slurry intermediate tank to the (5) pellet machine and back to (1). Besides a portion of the pellets, only the water formed from the condensation of the gas is continuously removed from this nearly closed circulating system. The discharge water (ca. 20 m$^3$/h) is drawn from the condenser, prepurified in a gravel filter, and pumped to the HCN stripper. Following a standing time of 24 to 48 hours, presuming that the plant is operating normally, it becomes necessary for the filter to be cleaned out through back flushing when the differential pressure above the gravel filter has reached the threshold value of 5–6 m of water column pressure. The back flush water (20 m$^3$) runs into the back flush well, from where it is delivered directly or after intermediate heating into the soot water tank to the circulating water in the soot slurry intermediate tank.

The rate of removal of the ash components introduced with the feedstock oil is as follows:

for vanadium: ca. 15%
for nickel: ca. 20%
for iron: ca. 30%

Only this part leaves the installation via the water route. The residue which is 85% of the introduced vanadium components
80% of the introduced nickel components
70% of the introduced iron components remain in circulation, is recycled by way of the gasification soot and thus again increases the ash input the gasification installation.

The resulting ash concentration with 100% recycling of the gasification soot within from 14 to 28 hours leads to intolerable ash contents in the feedstock oil.

This process has proven satisfactory, more or less, for low ash oils, and is still suitable with that stipulation.

Difficulties arise in the use of oils with higher heavy metal content. Here the standard process leads to very undesirable breakdowns.

EXAMPLE 1

A sample of the circulating water was placed in a 1-liter graduated vessel to determine the settling speed. At the start of the test the sample was uniformly turbid. Thirty minutes after filling, 1.5 cm$^3$ of sediment had formed. After another 30 minutes 2.4 cm$^3$ of sediment was measured. After that time, a further increase in sediment was not observed. The fluid above the sediment was free of suspended material.

EXAMPLE 2

In a 14-day field test, 15% of the circulating water of a heavy oil gasification plant was brought in a controlled manner to a sedimentation stage. Throughput totaled 0.2 m$^3$/m$^2$ of settling surface per hour. The heavy metal introduced into the sedimentation stage during the above time period totaled 0.95 t of vanadium, nickel and iron. The extracted yields were collected and reweighed. Calculation indicated a discharge of 0.730 t of heavy metal (V, Ni and Fe), i.e., an average efficiency of 77%.

EXAMPLE 3

In another 14-day test, back flush water from several gravel filters was brought to a sedimentation stage. The heavy metal introduced totaled 1.27 t of V, Ni and Fe. Following a settling time of 4 hours, the clarified water was drawn off. The sediment collected in the above time period were removed in the form of a viscous slurry and analyzed. The water in the slurry totaled 51% by weight. A total of 0.91 t of metals (V, Ni and Fe) were recovered, i.e., an average efficiency of 72%.

While the invention has been described and illustrated with reference to certain preferred embodiments thereof, those skilled in the art will appreciate that various changes, modifications and substitutions can be made therein without departing from the spirit of the invention. It is intended, therefore, that the invention be limited only by the scope of the claims which follow.

What is claimed as new and desired to be secured by Letters Patent of the United States is:

1. In a process for removing heavy metal ash from an aqueous soot suspension wherein said soot suspension is treated in the standard manner with organic adjuvants suitable for the separation of soot which organic adjuvants are not miscible in water, and the aqueous soot-free phase is separated, wherein the improvement comprises directing said aqueous phase, containing heavy metal ash, to a sedimentation stage for settling and subsequent removal from the water.

2. The process according to claim 1 wherein said aqueous soot suspension results from the production of synthetic gas through partial gasification of heavy oils, and following said treatment with organic adjuvants the separated soot is pelletized.

3. The process according to claim 1 wherein said aqueous phase containing said ash components is concentrated, preliminary to said sedimentation stage.

4. The process according to claim 1 where said improvement results in an efficiency of about 72% to about 77% for the removal of said heavy metal ash components.

5. The process according to claim 1 where said heavy metal ash component comprises compounds of heavy metals selected from V, Ni and Fe.

* * * * *